United States Patent
Lee et al.

(10) Patent No.: US 7,636,588 B2
(45) Date of Patent: Dec. 22, 2009

(54) METHOD FOR SAVING POWER IN A WIRELESS TELEPHONE

(75) Inventors: Seog-Geun Lee, Kumi-shi (KR); Soon-Jin Kim, Kumi-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 421 days.

(21) Appl. No.: 10/610,555

(22) Filed: Jul. 2, 2003

(65) Prior Publication Data

US 2004/0176145 A1    Sep. 9, 2004

(30) Foreign Application Priority Data

Mar. 4, 2003    (KR)    ............. 10-2003-0013220

(51) Int. Cl.
*H04B 1/38* (2006.01)
(52) U.S. Cl. ............ 455/574; 455/343.1; 455/343.2
(58) Field of Classification Search ......... 455/574, 455/343.1, 343.2, 343.5, 343.6, 127.5, 127.1, 455/445, 515, 311; 370/311
See application file for complete search history.

(56) References Cited

U.S. PATENT DOCUMENTS

| | | | | |
|---|---|---|---|---|
| 4,926,421 A * | 5/1990 | Kawano et al. | ............. | 370/331 |
| 5,287,400 A * | 2/1994 | Saegusa | .............. | 455/463 |
| 5,799,256 A * | 8/1998 | Pombo et al. | ............. | 455/574 |
| 5,987,012 A * | 11/1999 | Bruckert et al. | .......... | 370/331 |
| 6,035,191 A * | 3/2000 | Moore | .............. | 455/418 |
| 6,144,865 A * | 11/2000 | Pichard | .............. | 455/574 |
| 6,334,152 B1 * | 12/2001 | Mannings et al. | .......... | 709/227 |
| 6,360,091 B1 * | 3/2002 | Schellinger et al. | ...... | 455/403 |
| 6,528,980 B1 * | 3/2003 | Smith | ............... | 323/315 |
| 6,690,954 B2 * | 2/2004 | Ushida | .............. | 455/563 |
| 6,804,542 B1 * | 10/2004 | Haartsen | ............. | 455/574 |
| 7,349,694 B2 * | 3/2008 | Lee | ................. | 455/432.1 |
| 2002/0005804 A1 * | 1/2002 | Suprunov | ............. | 342/457 |
| 2002/0155866 A1 * | 10/2002 | Rainish et al. | .......... | 455/574 |
| 2002/0173316 A1 * | 11/2002 | Jang et al. | ............. | 455/453 |
| 2003/0080902 A1 * | 5/2003 | Roberts | .............. | 342/387 |
| 2004/0029620 A1 * | 2/2004 | Karaoguz | ............. | 455/574 |
| 2004/0204072 A1 * | 10/2004 | Han et al. | ............. | 455/557 |
| 2008/0032740 A1 * | 2/2008 | Joshi et al. | ............. | 455/557 |
| 2008/0194245 A1 * | 8/2008 | Leuca et al. | ............. | 455/419 |

* cited by examiner

*Primary Examiner*—Duc Nguyen
*Assistant Examiner*—Dominic E Rego
(74) *Attorney, Agent, or Firm*—Roylance, Abrams, Berdo & Goodman, L.L.P.

(57) ABSTRACT

A method for saving battery power in a wireless telephone which receives mode information from a base station in which information on a first mode where only a voice channel is searched, information on a second mode where a voice channel and a data channel are alternately searched while changing a search period of the data channel, and information on a third mode where a voice channel and a data channel are alternately searched at stated periods are registered. The method comprises searching mode information transmitted from the base station; searching a voice channel upon receiving first mode information from the base station; alternately searching a voice channel and a data channel while changing a search period of the data channel, upon receiving second mode information from the base station; and alternately searching the voice channel and the data channel at stated periods, upon receiving third mode information from the base station.

10 Claims, 6 Drawing Sheets

METHOD FOR SAVING POWER IN A WIRELESS TELEPHONE

PRIORITY

This application claims priority under 35 U.S.C. § 119 to an application entitled "Method for Saving Power in a Wireless Telephone" filed in the Korean Intellectual Property Office on Mar. 4, 2003 and assigned Ser. No. 2003-13220, the contents of which are incorporated herein by reference.

BACKGROUND OF THE INVENTION

1. Field of the Invention

The present invention relates generally to a wireless telephone using a hybrid mode of 1xEVDO (Evolution Data Only) technology, and in particular, to a method for saving battery power of a wireless telephone by changing a search period of a data channel in a standby state.

2. Description of the Related Art

FIG. 1 illustrates a process of alternately searching a voice channel and a data channel in a standby state of a wireless telephone according to the prior art. Referring to FIG. 1, 1xEVDO technology used for a wireless telephone supports a high data rate (HDR) technique in which only data is transmitted at a high rate, and a hybrid mode in which a voice call can be received while data is exchanged.

A wireless telephone using the hybrid mode searches a paging channel by alternately searching a voice channel and a data channel in a standby state. The voice channel and the data channel are both searched every 5.12 seconds, and in a standby state, the voice channel and the data channel are alternately searched every sleep mode period of 2.56 seconds. The wireless telephone repeats an operation of entering a sleep mode for 2.56 seconds and then searching a paging channel for about 80 msec.

In this context, the wireless telephone provides power to a radio frequency (RF) controller and a data processor for one frame (about 80 msec), while alternately searching the voice channel and the data channel every 2.56 seconds. The wireless telephone repeats an operation of entering a sleep mode for 2.56 seconds to cut off power supplied to the RF controller and the data processor, and then providing power to the RF controller and the data processor for one frame.

When the wireless telephone provides power to the RF controller and the data processor every frame at periods of 2.56 seconds, the battery of the wireless telephone is consumed more rapidly as compared to when one frame is searched at periods of 5.12 seconds.

SUMMARY OF THE INVENTION

It is, therefore, an object of the present invention to provide a method for searching only a voice channel in a standby state of a wireless telephone using a hybrid mode of 1xEVDO technology.

To achieve the above and other objects, the embodiments of the present invention provide a method for saving battery power in a wireless telephone. The method comprises searching a voice channel in a standby state and accessing data upon receiving a data request in the standby state in which the voice channel is searched.

To achieve the above and other objects, the embodiments of the present invention provide a method for saving battery power in a wireless telephone. The method comprises registering a voice signal and a data signal, alternately searching a voice channel and a data channel, increasing a search period of the data channel if a data signal is received within a predetermined search period in the data channel searching step, and decreasing the search period of the data channel if no data signal is received within the predetermined search period in the data channel searching step.

To achieve the above and other objects, the embodiments of the present invention provide a method for saving battery power of a wireless telephone which receives mode information from a base station, and wherein the mode information comprises information on a first mode where only a voice channel is searched, information on a second mode where a voice channel and a data channel are alternately searched while changing a search period of the data channel, and information on a third mode where a voice channel and a data channel are alternately searched at stated periods are registered. The method comprises searching mode information transmitted from the base station, searching a voice channel upon receiving first mode information from the base station, alternately searching a voice channel and a data channel while changing a search period of the data channel, upon receiving second mode information from the base station, and alternately searching the voice channel and the data channel at stated periods, upon receiving third mode information from the base station.

BRIEF DESCRIPTION OF THE DRAWINGS

The above and other objects, features and advantages of the embodiments of the present invention will become more apparent from the following detailed description when taken in conjunction with the accompanying drawings in which.

DETAILED DESCRIPTION OF THE PREFERRED EMBODIMENTS

Several embodiments of the present invention will now be described in detail with reference to the annexed drawings. In the following description, a detailed description of known functions and configurations incorporated herein has been omitted for conciseness.

Figure 1:
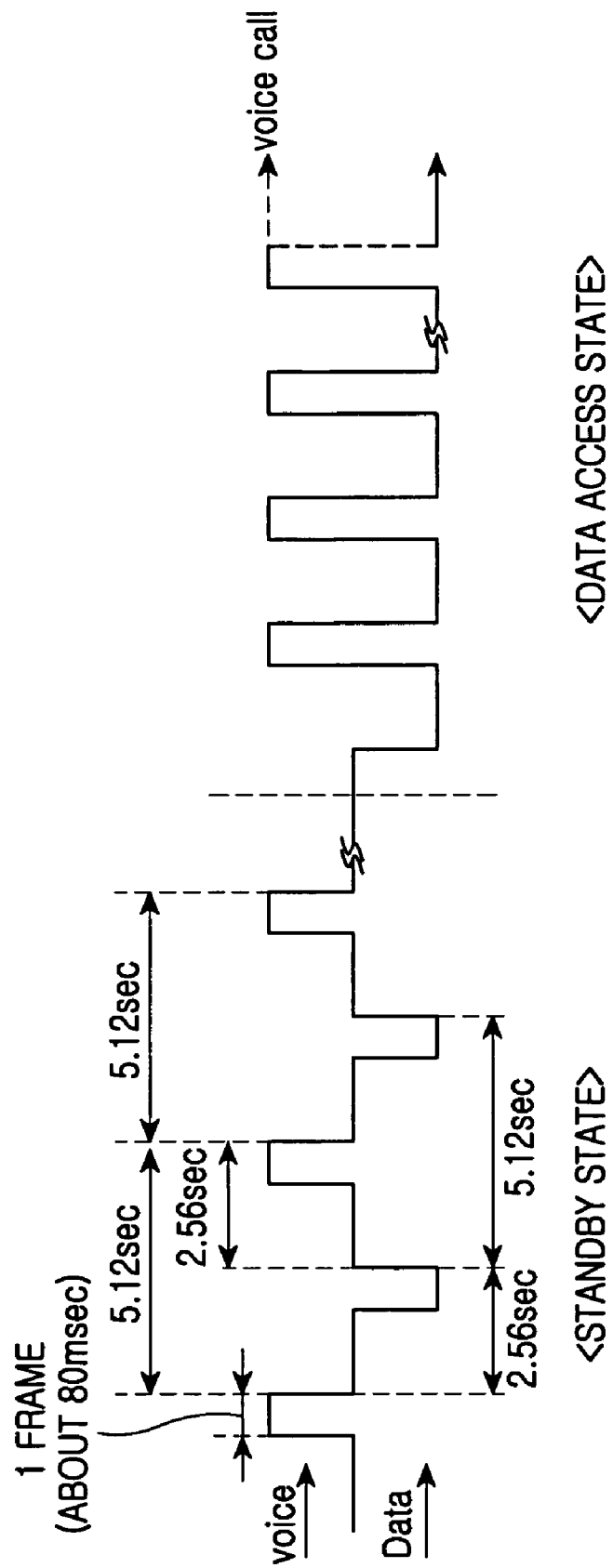
FIG. 1 illustrates a process of alternately searching a voice channel and a data channel in a standby state of a wireless telephone according to the prior art.
Figure 2:
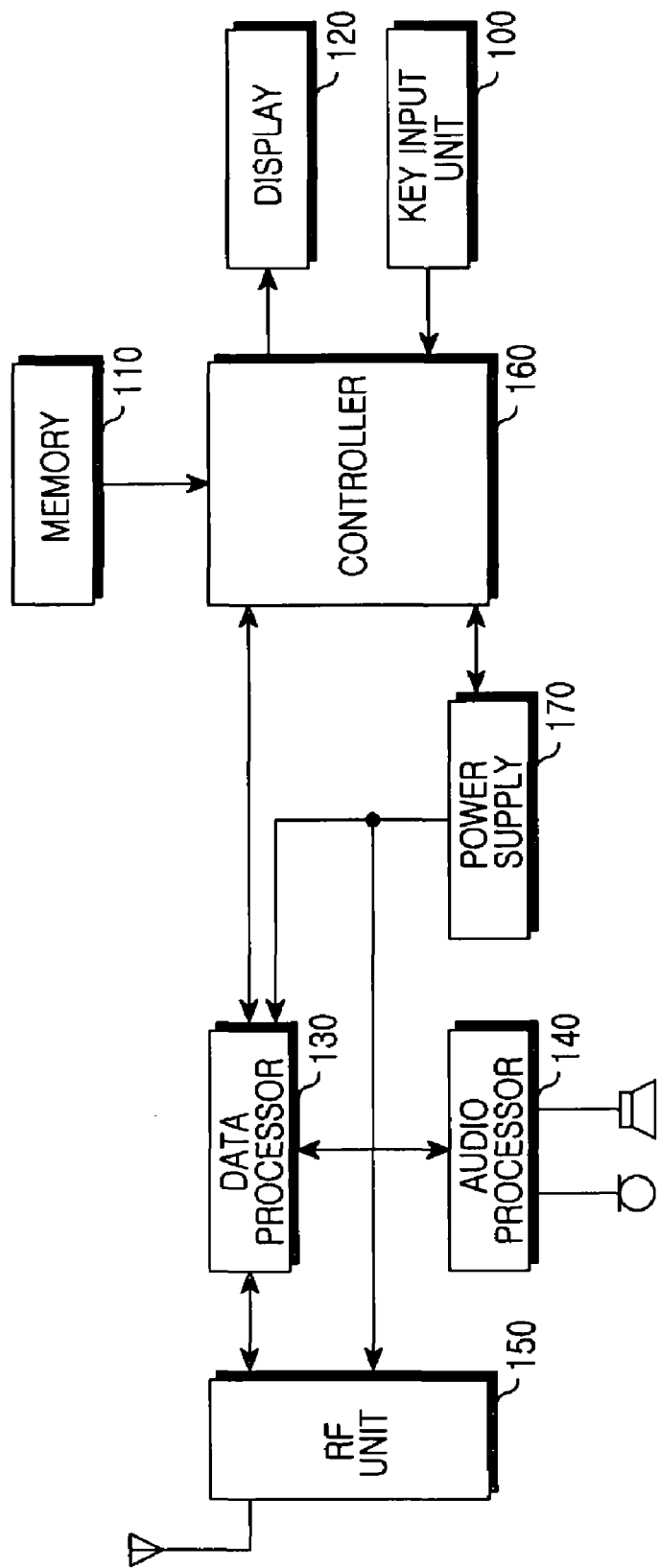
FIG. 2 is a block diagram illustrating a wireless telephone according to an embodiment of the present invention.

FIG. 2 is a block diagram illustrating a wireless telephone according to an embodiment of the present invention. Referring to FIG. 2, a key input unit 100 includes alphanumeric keys for inputting numeric and text information, and function keys for setting various functions. A memory 110 can be comprised of a program memory and a data memory. The program memory stores programs for controlling a general operation of the wireless telephone, and the data memory temporarily stores data generated during execution of the programs. According to the present invention, the memory 110 includes a flash memory or an EEPROM (electronically erasable programmable read only memory), in which a search period of a data channel can be stored.

A display 120, under the control of a controller 160, displays an operating state of the wireless telephone and a key manipulation state of a user. A data processor 130 includes a transmitter for coding and modulating a transmission signal, and a receiver for demodulating and decoding a received signal. Thus, the data processor 130 can be comprised of a MODEM (modulator-demodulator) and a CODEC (coder-decoder). An audio processor 140 reproduces a received audio signal output from the data processor 130, or provides a transmission audio signal generated from a microphone to the data processor 130. An RF unit 150 controls communication of the wireless telephone. The RF unit 150 includes an RF transmitter for up-converting a frequency of a transmission signal and amplifying the up-converted transmission signal, and an RF receiver for low-noise-amplifying a received signal and down-converting a frequency of the low-noise-amplified signal.

The controller 160 controls the overall operation of the wireless telephone. The controller 160 can include the data processor 130 therein. According to a first embodiment of the present invention, the controller 160 controls the wireless telephone to search only a voice channel in a standby state, and access data upon receipt of a data request from a user. According to a second embodiment of the present invention, the controller 160 alternately searches a voice channel and a data channel in the standby state, and then increases a search period of the data channel if a data signal is detected for the search period of the data channel. However, if no data signal is detected for the search period of the data channel, the controller 160 decreases the search period of the data channel. According to a third embodiment of the present invention, the controller 160 receives mode information from a base station, and searches channels according to a corresponding mode in the standby state. A power supply 170 cuts off power provided to the data processor 130 and the RF unit 150 in a sleep mode and provides power to the data processor 130 and the RF unit 150 for one frame (about 80 msec) during which a paging channel is searched.

Operation of the wireless telephone will now be described with reference to FIG. 2. If a user performs a dialing operation and then sets a call origination mode for call origination by means of the key input unit 100, the controller 160 processes dial information received through the data processor 130, and then converts the processed dial information into an RF signal by means of the RF unit 150. Thereafter, if the called subscriber generates a response signal, the wireless telephone detects the response signal by way of the RF unit 150 and the data processor 130. The user then performs a communication function through a speech path formed by the audio processor 140. In a call termination mode, upon detecting the call termination mode through the data processor 130, the controller 160 generates a ring signal by means of the audio processor 140. If the user responds to the ring signal, the controller 160 forms a speech path by means of the audio processor 140 and performs a communication function over the speech path. Although the call origination and termination modes have been described with reference to voice communication, the invention can be applied to data communication such as packet data communication and image data communication as well as the voice communication. In a standby state or when text communication is performed, the controller 160 displays text data processed by the data processor 130 on the display 120.

Operation of saving power of the wireless telephone will now be described. If a user generates a data request while searching only a voice channel in a standby state, data access is carried out. Alternatively, if a data signal is detected in a search period of the data channel while a paging channel is searched by alternately searching a voice channel and a data channel in the standby state, the search period of the data channel is increased. However, if no data signal is detected, the search period of the data channel is decreased. In addition, the wireless telephone receives mode information for channel search from a base station and performs channel search in the corresponding mode in the standby state.

Figure 3:
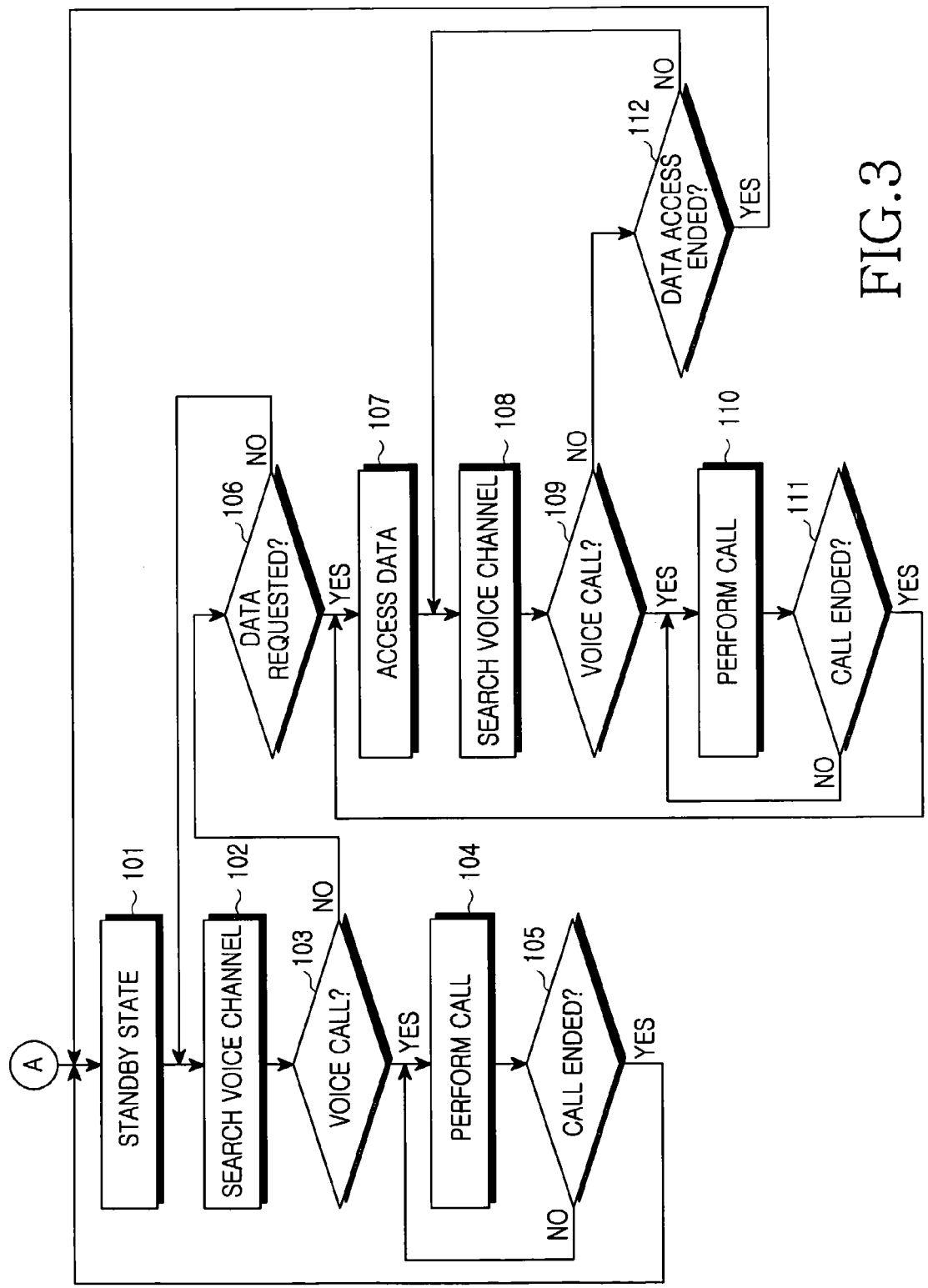
FIG. 3 is a flowchart illustrating a procedure for saving power of a wireless telephone according to a first embodiment of the present invention.
Figure 4:
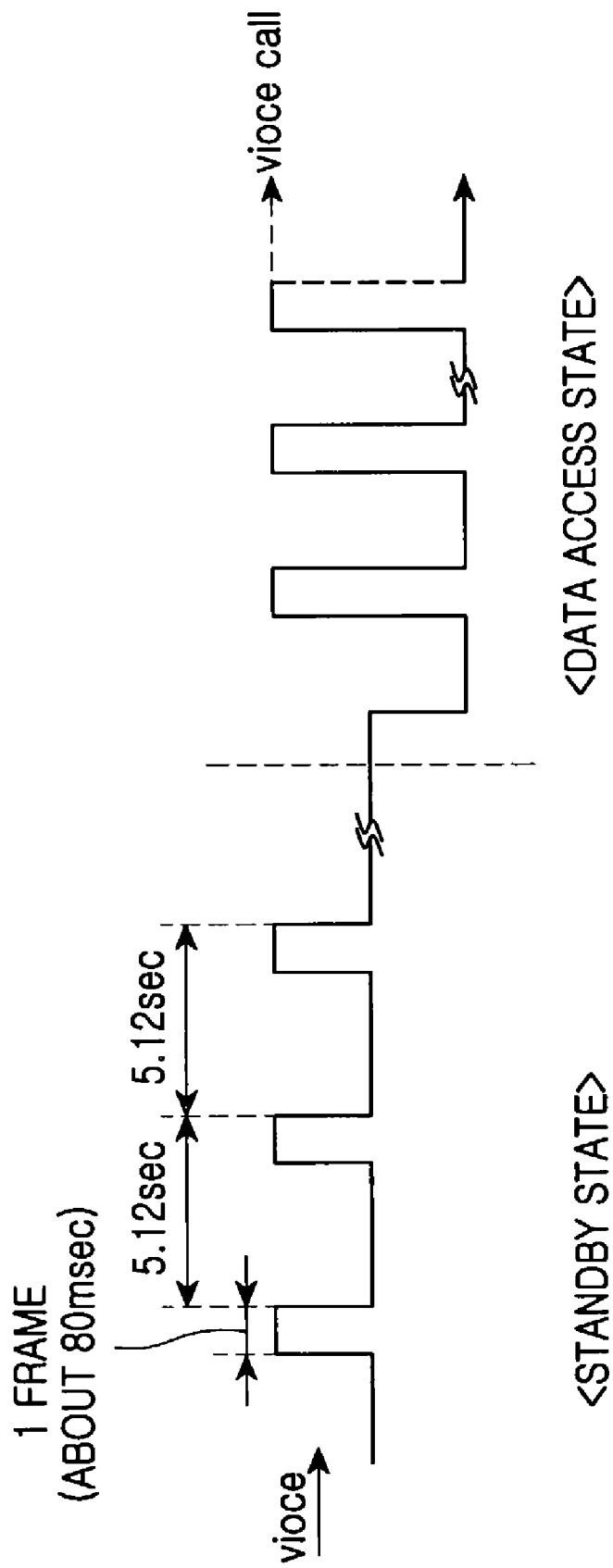
FIG. 4 illustrates a process of searching only a voice channel in a standby state based on the procedure of FIG. 3.

FIG. 3 is a flowchart illustrating a procedure for saving power in a wireless telephone according to a first embodiment of the present invention, and FIG. 4 illustrates a process of searching only a voice channel in a standby state based on the procedure of FIG. 3.

The first embodiment of the present invention will now be described in detail with reference to FIGS. 2 to 4. In a standby state of step 101, a controller 160 proceeds to step 102 where it searches only a voice channel. In step 102, the controller 160 controls a power supply 170 to provide power to an RF unit 150 and a data processor 130 for one frame (about 80 msec), during which a paging channel is searched. For a sleep mode period of 5.12 seconds, the controller 160 controls the power supply 170 to cut off power supplied to the RF unit 150 and the data processor 130.

Referring to FIG. 3, if a voice call signal is transmitted while the voice channel is repeatedly searched for one frame every sleep mode period of 5.12 seconds, the controller 160 perceives this in step 103 ("Yes" path from decision step 103), and then proceeds to step 104. In step 104, the controller 160 generates a ring signal by means of an audio processor 140 and performs a call. If the call is ended in step 104, the controller 160 perceives this in step 105 ("Yes" path from decision step 105) and then returns to step 101 to search again a voice channel in the standby state.

If a user generates a data request by using a key input unit 100 in step 102 where the voice channel is searched ("No" path from decision step 103), the controller 160 perceives this in step 106 ("Yes" path from decision step 106) and then proceeds to step 107 where it accesses data. In step 107, where the user accesses data, the controller 160 proceeds to step 108 where it repeatedly searches a voice channel for one frame every 5.12 seconds period through a paging channel. If a voice call signal is transmitted in step 108, the controller 160 perceives this in step 109 ("Yes" path from decision step 109), and then proceeds to step 110 where it generates a ring signal by means of the audio processor 140 and performs a call. If the call is ended in step 110, the controller 160 perceives end of the call in step 111 ("Yes" path from decision step 111) and then returns to step 107 to access data. If data access is ended in step 107, and there is no voice call ("No" path from decision step 109), the controller 160 perceives the end of the data access in step 112 ("Yes" path from decision step 112), and then proceeds to step 101 to search a voice channel in the standby state.

Figure 5:
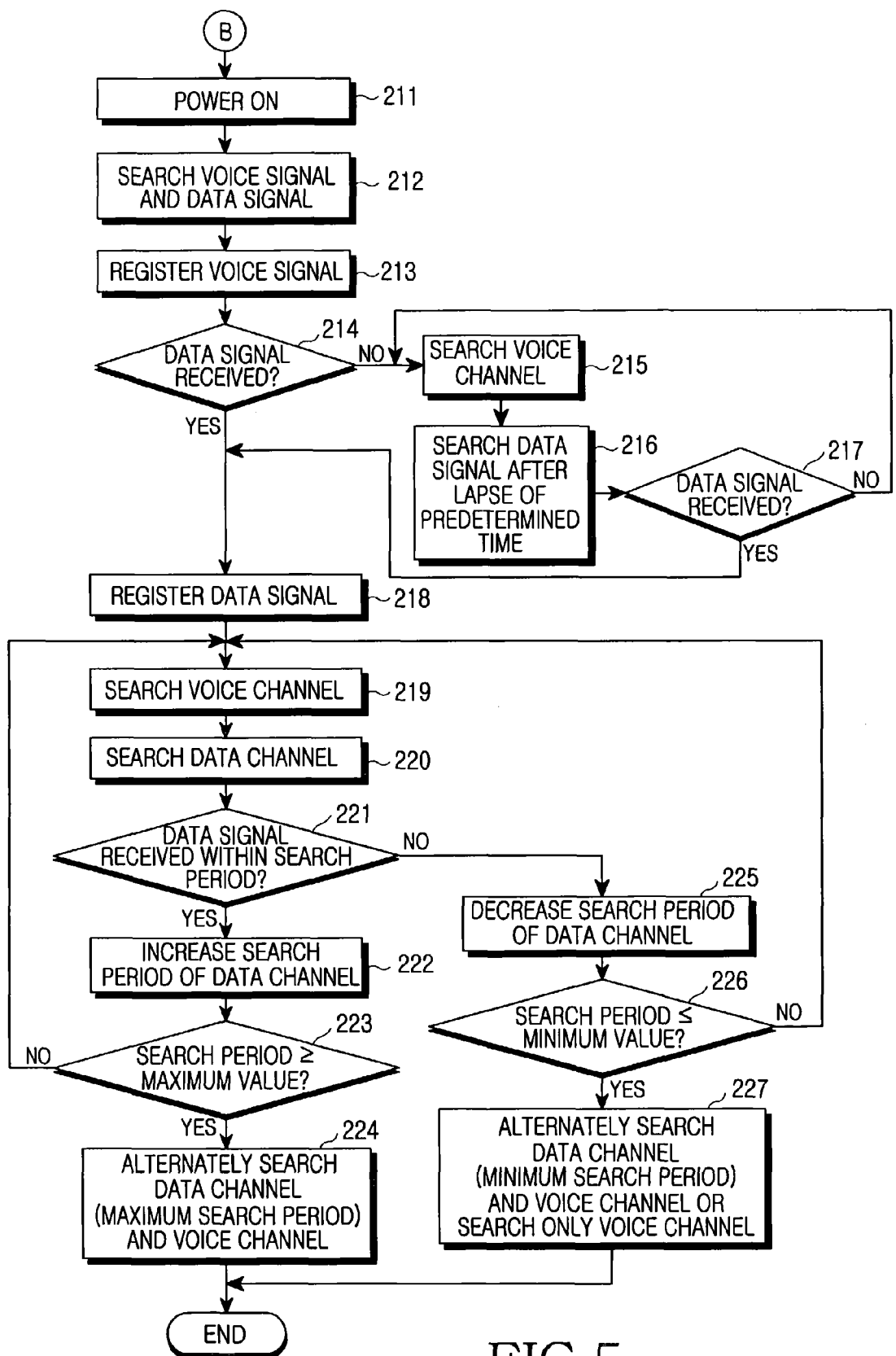
FIG. 5 is a flowchart illustrating a procedure for saving power of a wireless telephone according to a second embodiment of the present invention.

FIG. 5 is a flowchart illustrating a procedure for saving power in a wireless telephone according to a second embodiment of the present invention.

A second embodiment of the present invention will now be described in detail with reference to FIGS. 2 and 5. If the wireless telephone is powered on in step 211, the controller 160 searches for a voice or data signal by searching a paging channel by alternately searching a voice channel and a data channel in step 212. The paging channel is searched for one frame by alternately searching the voice channel and the data channel every 2.56 seconds. If a voice signal is received in step 212, the controller 160 registers the voice signal in a base station in step 213. However, if a data signal is received in step 212, the controller 160 perceives this in step 214 ("Yes path from decision step 214), and then proceeds to step 218 where it registers the data signal in the base station. If no data signal is received in step 212, the controller 160 perceives this in step 214 ("No" path from decision step 214), and then proceeds to step 215 where it registers the voice signal in the base station and searches only the voice channel. In step 215, the controller 160 determines whether a data signal is received after a lapse of a predetermined time (step 216). If the data signal is received, the controller 160 perceives receipt of the data signal in step 217 ("Yes" path from decision step 217), and then proceeds to step 218 where it registers the data signal in the data base.

When the voice signal and the data signal are registered in the base station, the controller 160 searches a paging channel for one frame by alternately searching a voice channel in step 219 and a data channel in step 220, every sleep mode period. The sleep mode period of the data channel can be set on the basis of a slot defined in the base station, or can be optionally set by the user according to the wireless telephone.

If a search period of the data channel is set on the basis of the slot defined in the base station, a paging channel is searched for one frame by alternately searching the voice channel in step 219 and the data channel in step 220 every 2.56 seconds during the sleep mode period. The data channel is searched in step 220 after the voice channel is searched in step 219, and if a data signal is received for one frame after a lapse of a 2.56 second slot period, the controller 160 perceives receipt of the data signal in step 221 ("Yes" path from decision step 221), and then proceeds to step 222. In step 222, the controller 160 adds a current sleep mode period value (2.56 seconds) of the data channel to a previous sleep mode period value and stores the resulting value in the memory 110. Alternatively, the controller 160 can increase the sleep mode period by a predetermined value and store the increased sleep mode period value in the memory 110.

If the increased sleep mode period value of the data channel does not exceed a predetermined maximum value, the controller 160 perceives this in step 223 ("No" path from decision step 223), and then returns to step 219. If the sleep mode period of the data channel is greater than or equal to the maximum value while steps 219 to 223 are repeatedly performed, the controller 160 perceives this in step 223 ("Yes" path from decision step 223), and then proceeds to step 224. In step 224 it searches a paging channel for one frame by alternately searching a data channel and a voice channel, both having a sleep mode period of the maximum value. In this process, the paging channel is searched for one frame every 2.56 seconds sleep mode period by alternately searching the voice channel and the data channel. The maximum value and the predetermined increment value are previously set and stored in the memory 110.

The data channel is searched in step 220 after the voice channel is searched in step 219. If no data signal is received for one frame after a lapse of one 2.56 second sleep mode period, the controller 160 perceives this in step 221, and proceeds to step 225 ("No" path from decision step 221). In step 225, the controller 160 decreases the sleep mode period value (2.56 seconds) of the data channel by a predetermined value, and stores the decreased sleep mode period value in the memory 110. If the decreased sleep mode period of the data channel is greater than or equal to the predetermined minimum value, the controller 160 perceives this in step 226, and returns to step 219 ("No" path from decision step 226). If the sleep mode period value of the data channel becomes smaller than the minimum value while steps 219 to 226 are repeatedly performed, the controller 160 perceives this in step 226 and proceeds to step 227 ("Yes" path from decision step 226). In step 227, the controller 160 searches a paging channel for one frame by alternately searching a data channel and then a voice channel, both having a sleep mode period of the minimum value. If the minimum value is smaller than 1 sec in step 226, only the voice channel can be searched in step 227. In this process, the controller 160 searches a paging channel for one frame every 2.56 second sleep mode period by alternately searching the voice channel and then the data channel. The maximum value and the predetermined decrement value are previously set and stored in the memory 110.

Figure 6:
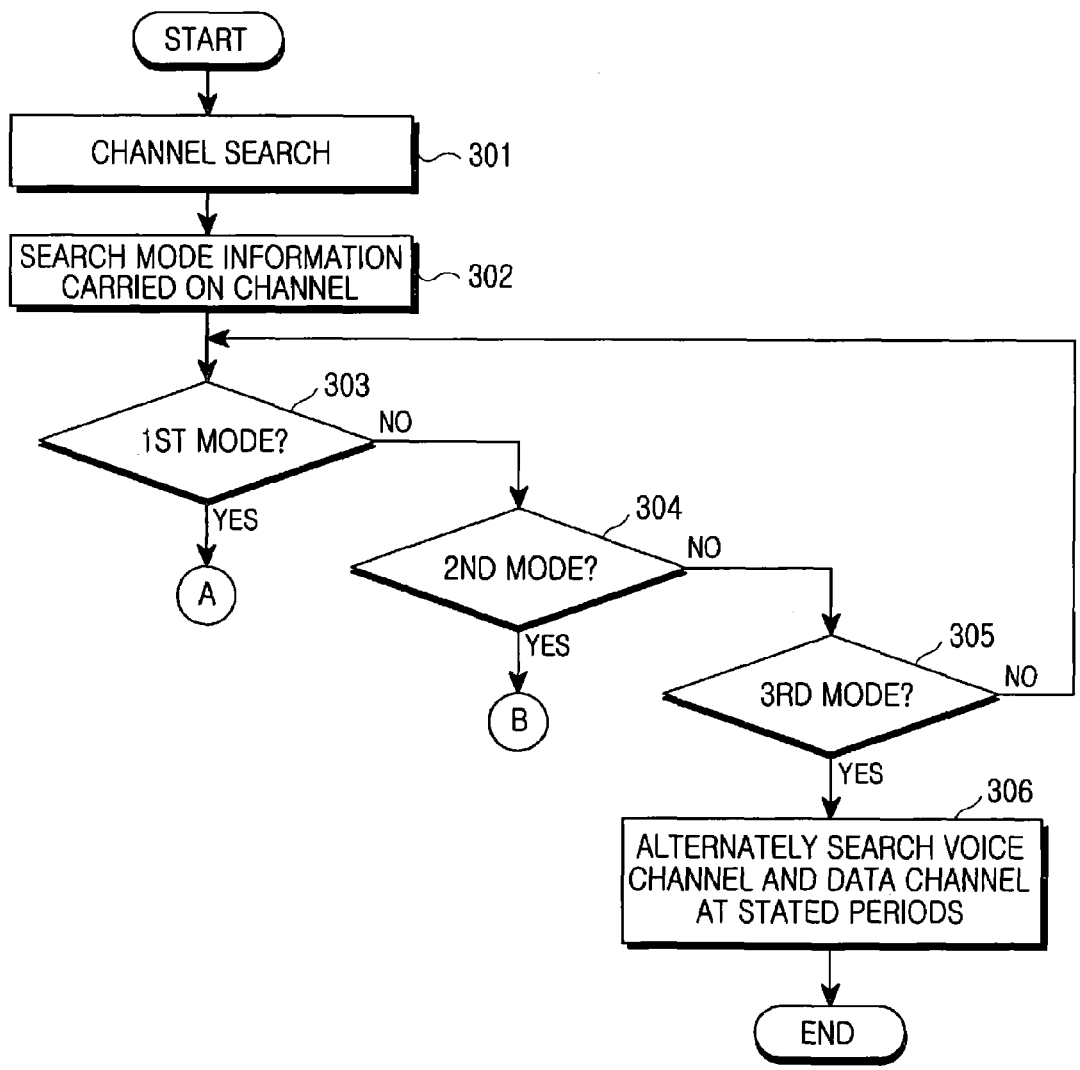
FIG. 6 is a flowchart illustrating a procedure for saving power of a wireless telephone according to a third embodiment of the present invention.

FIG. 6 is a flowchart illustrating a procedure for saving power in a wireless telephone according to a third embodiment of the present invention. In this embodiment, a first mode refers to a voice designated mode in which only a voice channel is searched in a standby state, and this mode corresponds to the procedure of FIG. 3. A second mode refers to a hybrid-off mode in which a search period of the data channel is changed by increasing or decreasing a search period of the data channel when alternately searching the data channel and the voice channel in a standby state, and this mode corresponds to the procedure of FIG. 5. A third mode refers to an existing hybrid-on mode in which a voice channel and a data channel are alternately searched in a standby state. Information on the first mode, second mode and third mode is previously registered in a base station.

The third embodiment of the present invention will now be described in detail with reference to FIGS. 2, 4 and 6.

In step 301, a controller 160 of the wireless telephone searches a channel transmitted from a base station, and then proceeds to step 302 where it searches mode information carried on the channel. Here, the channel carrying the mode information on its header can be a broadcasting channel broadcasted from the base station, or a paging channel.

If '0001' representing first mode information is detected from a header of the channel in step 302, the controller 160 perceives this in step 303 ("Yes" path from decision step 303) and proceeds to step 101 of FIG. 3 where it searches only a voice channel in a standby state (represented by "A" in FIG. 6).

However, if '0010' representing second mode information is detected from the header of the channel in step 302, the controller 160 perceives this in step 304 ("Yes" path from decision step 304), and proceeds to step 211 of FIG. 5 where it searches a paging channel by alternately searching a voice channel and a data channel while changing a search period of the data channel in a standby state (represented by a "B" in FIG. 6).

In addition, if '0100' representing third mode information is detected from the header of the channel in step 302, the controller 160 perceives this in step 305 and proceeds to step 306 ("Yes" path from decision step 305). In step 306, a paging channel is searched for one frame by alternately searching a voice channel and then a data channel every 2.56 second period in a standby state. If a voice signal is detected from the voice channel, a call is attempted, and if a data signal is detected from the data channel, data access is performed.

As described above, the various embodiments of the present invention have the advantages of reducing power consumption of a wireless telephone battery, by changing the period of a sleep mode in a standby state of the wireless telephone using a hybrid mode of 1×EVDO technology, thereby increasing the life span of the battery.

While the various embodiments of the invention have been shown and described with reference to the figures, it will be understood by those skilled in the art that various changes in form and details may be made therein without departing from the spirit and scope of the invention as defined by the appended claims.

What is claimed is:

1. A method for saving power of a battery in a wireless telephone capable of searching a voice channel and a data channel, comprising the steps of:
    searching only a voice channel and not a data channel in a standby state;
    accessing data upon receiving a data request from a user in the standby state in which the voice channel is searched;
    searching a voice channel after said accessing data;
    performing a call if a voice signal is transmitted during said accsseing data where the voice channel is searched; and
    performing said accessing data when the call is ended.

2. The method of claim 1, wherein a call is performed if a voice signal is transmitted in the standby state.

3. A method for saving power of a battery in a wireless telephone capable of searching a voice channel and a data channel, comprising the steps of:
    alternately searching a voice channel and a data channel if a wireless telephone is powered on;
    registering the searched voice signal in a base station if the voice channel is searched, and registering the searched data signal in the base station if the data channel is searched;
    alternately searching the voice channel and the data channel if the voice signal and the data signal are registered in the base station;
    increasing a search period of the data channel if a data signal is received within a predetermined search period set on the basis of a slot defined in the base station or set by a user in the data channel searching step; and
    decreasing the search period of the data channel if no data signal is received within the predetermined search period set on the basis of a slot defined in the base station or set by a user in the data channel searching step.

4. The method of claim 3, wherein the search period of the data channel is automatically increased or decreased.

5. The method of claim 3, wherein the search period of the data channel is increased or decreased by a predetermined value.

6. A method for saving battery power in a wireless telephone capable of searching a voice channel and a data channel, which receives mode information from a base station in which the mode information comprising information on a first mode where only a voice channel is searched, information on a second mode where a voice channel and a data channel are alternately searched while changing a search period of the data channel, and information on a third mode where a voice channel and a data channel are alternately searched at stated periods are registered, the method comprising the steps of:
    (a) searching mode information transmitted from the base station;
    (b) searching a voice channel upon receiving first mode information from the base station;
    (c) alternately searching a voice channel and a data channel while changing a search period of the data channel, upon receiving second mode information from the base station; and
    (d) alternately searching the voice channel and the data channel at stated periods, upon receiving third mode information from the base station.

7. The method of claim 6, wherein the step (b) comprises the steps of:
    searching a voice channel in the standby state; and
    accessing data upon receiving a data request in a standby state where only the voice channel is searched.

8. The method of claim 6, wherein the step (c) comprises the step of:
    registering a voice signal and a data signal;
    alternately searching a voice channel and a data channel;
    increasing a search period of the data channel if a data signal is received within a predetermined search period in the data channel searching step; and
    decreasing the search period of the data channel if no data signal is received within the predetermined search period in the data channel searching step.

9. An apparatus for saving power of a battery in a wireless telephone capable of searching a voice channel and a data channel, comprising:
    an RF unit for processing transmitted signals and received signals;
    a data processing unit for coding and modulating the transmitted signals and demodulating and decoding the received signals;
    an input device for receiving input from a user; and
    a controller unit programmed to control operations of the wireless telephone and to selectively control the supply of power to the RF unit and the data processing unit, the controller unit controlling the supply of power to the data processor unit during a search of the paging channel in a standby state for searching only a voice channel, the supply of power to the RF unit and the data processor unit being terminated in a sleep mode;
    wherein the controller unit is further programmed to control searching, during the first interval, of only a voice channel and not a data channel of the wireless telephone when it is in the standby state, and accessing of data in response to a data request from the user via the input device during the first time interval in which the voice channel is searched;
    wherein the controller unit is further programmed to control searching a voice channel after the data access, performing a call if a voice signal is transmitted in a data access state where the voice channel is searched, and performing the data access when the call is ended.

10. The apparatus of claim 9, wherein the controller unit is further programmed to control performing a call if a voice signal is transmitted in the standby state.

* * * * *

UNITED STATES PATENT AND TRADEMARK OFFICE
CERTIFICATE OF CORRECTION

PATENT NO. : 7,636,588 B2  
APPLICATION NO. : 10/610555  
DATED : December 22, 2009  
INVENTOR(S) : Lee et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 694 days.

Signed and Sealed this

Ninth Day of November, 2010

David J. Kappos
*Director of the United States Patent and Trademark Office*